United States Patent
Barton et al.

(10) Patent No.: US 7,980,067 B2
(45) Date of Patent: Jul. 19, 2011

(54) METHOD TO OPERATE VEHICLE WITH INTERNAL COMBUSTION ENGINE AND EXHAUST AFTERTREATMENT SYSTEM ACCORDING TO DETECTED DRIVE CYCLES

(75) Inventors: Jason Thomas Barton, Canton, MI (US); James Erik Plastow, Fenton, MI (US); Justin Adam Shetney, Livonia, MI (US); Matthew Thomas Baird, Canton, MI (US); Mark Allen Zurawski, Northville, MI (US); Bryant Chan Pham, Canton, MI (US)

(73) Assignee: Detroit Diesel Corporation, Detroit, MI (US)

( * ) Notice: Subject to any disclaimer, the term of this patent is extended or adjusted under 35 U.S.C. 154(b) by 879 days.

(21) Appl. No.: 11/961,143

(22) Filed: Dec. 20, 2007

(65) Prior Publication Data

US 2009/0164085 A1 Jun. 25, 2009

(51) Int. Cl.
*F01N 3/00* (2006.01)
*F01N 3/10* (2006.01)
*F01N 3/02* (2006.01)

(52) U.S. Cl. .......... 60/295; 60/274; 60/299; 60/311

(58) Field of Classification Search .......... 60/273, 60/285, 286, 295, 297, 299, 311, 274; 95/11, 95/21, 148, 276, 278, 279, 283; 96/130, 96/143; 701/102, 103, 110, 114, 115; 702/182, 702/183, 185

See application file for complete search history.

(56) References Cited

U.S. PATENT DOCUMENTS

| | | |
|---|---|---|
| 5,347,809 A | 9/1994 | Moeckel et al. |
| 6,901,751 B2 | 6/2005 | Bunting et al. |
| 7,120,286 B2 | 10/2006 | Yu et al. |
| 7,235,124 B2 | 6/2007 | Liu et al. |
| 2004/0148084 A1* | 7/2004 | Minami .......... 701/55 |
| 2005/0223700 A1* | 10/2005 | Abe .......... 60/295 |
| 2006/0130460 A1 | 6/2006 | Warner |
| 2006/0130468 A1 | 6/2006 | Sun et al. |
| 2006/0288692 A1 | 12/2006 | Opris et al. |
| 2007/0068147 A1 | 3/2007 | Sun et al. |

FOREIGN PATENT DOCUMENTS

EP 1087114 A1 * 3/2001

OTHER PUBLICATIONS

Lang, English Abstract of EP 1087114 A1, Mar. 28, 2001.*

* cited by examiner

*Primary Examiner* — Thomas E Denion
*Assistant Examiner* — Audrey Klasterka
(74) *Attorney, Agent, or Firm* — Bill C. Panagos; Rader, Fishman & Grauer PLLC

(57) ABSTRACT

A method to detect drive cycles of a vehicle and modify engine operation according to the detected drive cycles to effect regeneration of exhaust components, particularly the Diesel Particulate Filter.

11 Claims, 2 Drawing Sheets

METHOD TO OPERATE VEHICLE WITH INTERNAL COMBUSTION ENGINE AND EXHAUST AFTERTREATMENT SYSTEM ACCORDING TO DETECTED DRIVE CYCLES

TECHNICAL FIELD OF THE INVENTION

During the operation of vehicles with internal combustion engines, specifically electronically controlled heavy duty diesel engines, equipped with sensors and aftertreatment exhaust systems, it has traditionally been a tradeoff between operating the vehicle in urban and highway settings. During normal operation, which is usually designated as highway cycle operation, the engine and the aftertreatment operate in a way as to maximize fuel economy and after treatment component life, as well as to minimize emissions, particularly soot and particulate material (PM). To that end, exhaust systems include diesel particulate filters to trap soot and PM and hold it for disposal during Diesel Particulate Filter (DPF) regeneration cycles. However, during intra-city transits and in other operating modes such as operating in an extended idle mode beyond a predetermined period of time, higher than average engine speed gradients coupled with lower vehicle speed and low aftertreatment temperatures, the DPF may become overburdened with soot and PM, and the light off temperature of any Diesel Oxidation Catalyst (DOC) may be lower than the engine controller is programmed to accept to initiate a regeneration of the DPF. In addition, during such urban driving cycles, the DPF may be regenerated multiple times, thereby shortening the life of the component.

There is a need to provide for a method to operate and engine to detect when the vehicle is operating in an urban setting or driving mode and modify the operation of the exhaust aftertreatment system as well as the regeneration of the DPF during those periods of time under those conditions.

BRIEF SUMMARY OF THE INVENTION

In one embodiment, the present invention relates to a method for operating an internal combustion engine in a vehicle. The engine is equipped with an Engine Control System (ECS) with memory, and an exhaust after treatment system including sensors, a Diesel Oxidation Catalyst (DOC), and a Diesel Particulate Filter (DPF), to detect drive cycle and adjust engine aftertreatment operation accordingly. The method includes determining whether an average operating parameter is outside a predetermined threshold for a predetermined period of time; and applying a multiplier to miles driven, time duration and fuel consumed during vehicle operation to modify DOC regeneration interval and utilize lower DOC light off temperature threshold to regenerate said DPF and shorten intervals between DPF regeneration. The average operating parameter may be the average engine speed gradient above a predetermined threshold for a predetermined period of time, the average vehicle speed below a predetermined threshold for a predetermined period of time, or the average temperature of an aftertreatment device lower than a predetermined threshold for a predetermined period of time. The multiplier is a factor designed to cause the controller to perform as if a perceived period of time is greater than actual, the miles driven is perceived to be greater than actually driven, and the fuel consumed is greater than actually consumed to shorten any interval between aftertreatment regeneration cycles. In one preferred embodiment, the multiplier value is approximately 1.25.

In another embodiment the present invention relates to a method for operating an internal combustion engine in a vehicle. The engine is equipped with an Engine Control System (ECS) with memory, and an exhaust after treatment system including sensors, a Diesel Oxidation Catalyst (DOC), and a Diesel Particulate Filter (DPF), to detect drive cycle and adjust engine aftertreatment operation accordingly. The method includes:

determining whether an average engine speed gradient is above a predetermined threshold for a predetermined period of time;

determining whether an average vehicle speed is below a predetermined threshold for a predetermined period of time;

determining whether an average temperature of an aftertreatment component is lower that a predetermined threshold for a predetermined period of time; and applying a multiplier to miles driven, time duration and fuel consumed during vehicle operation to modify DOC regeneration interval and utilize lower DOC light off temperature threshold to regenerate the DPF and shorten intervals between DPF regeneration.

The multiplier is a factor designed to cause the controller to perform as if a perceived period of time is greater than actual, the miles driven is perceived to be greater than actually driven, and the fuel consumed is greater than actually consumed to shorten the interval between aftertreatment regeneration cycles, and, in a preferred embodiment, is approximately 1.25. The lower DOC light off temperature is in a range of about 275° C.

DETAILED DESCRIPTION OF THE PREFERRED EMBODIMENT(S)

Figure 1:
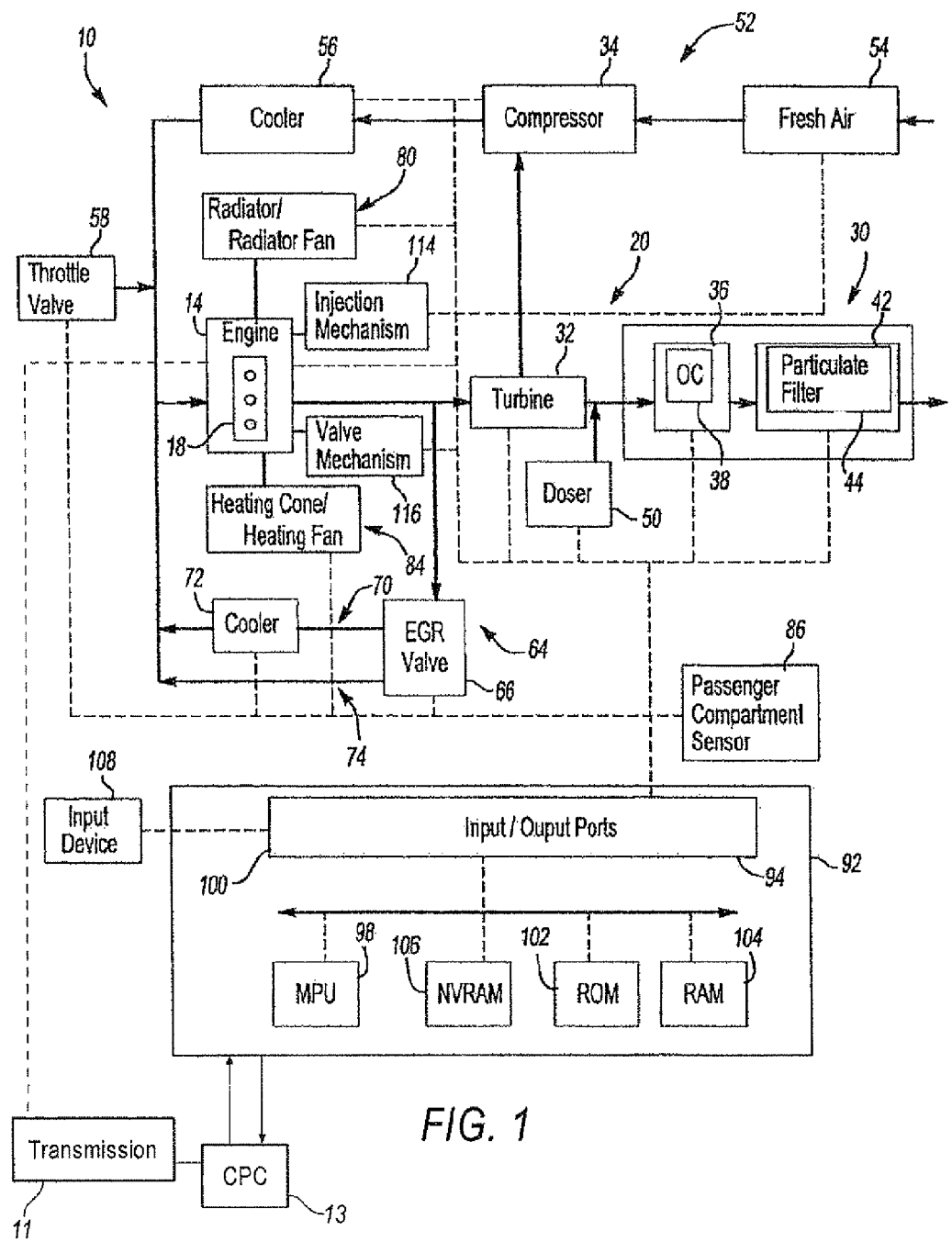
FIG. 1 is a schematic representation of a vehicle equipped with an internal combustion engine according to one embodiment off the present invention.

FIG. 1 illustrates a vehicle powertrain system 10 in accordance with one non-limiting aspect of the present invention. The system 10 may provide power for driving any number of vehicles, including on-highway trucks, construction equipment, marine vessels, stationary generators, automobiles, trucks, tractor-trailers, boats, recreational vehicle, light and heavy-duty work vehicles, and the like.

The system 10 may be referred to as an internal combustion driven system wherein fuels, such as gasoline and diesel fuels, are burned in a combustion process to provide power, such as with a spark or compression ignition engine 14. The engine 14 may be a diesel engine that includes a number of cylinders 18 into which fuel and air are injected for ignition as one skilled in the art will appreciate. The engine 14 may be a multi-cylinder compression ignition internal combustion engine, such as a 4, 6, 8, 12, 16, or 24 cylinder diesel engines, for example. It should be noted, however, that the present invention is not limited to a particular type of engine or fuel. The engine is cooperatively engaged by transmission 11 by a flywheel and either a clutch or a torque converter as is customary with engines and transmissions. The transmission has an ECU 13, which is in data communication with the engine control system, as will herein after be described.

Exhaust gases generated by the engine 14 during combustion may be emitted through an exhaust system 20. The exhaust system 20 may include any number of features, including an exhaust manifold and passageways to deliver the emitted exhaust gases to a particulate filter assembly 30, which in the case of diesel engines is commonly referred to as a diesel particulate filter. Optionally, the system 20 may include a turbocharger proximate the exhaust manifold for compressing fresh air delivery into the engine 14. The turbocharger, for example, may include a turbine 32 and a compressor 34, such as a variable geometry turbocharger (VGT) and/or a turbo compound power turbine. Of course, the present invention is not limited to exhaust systems having turbochargers or the like.

The particulate filter assembly 30 may be configured to capture particulates associated with the combustion process. In more detail, the particulate filter assembly 30 may include an oxidation catalyst (OC) canister 36, which in includes an OC 38, and a particulate filter canister 42, which includes a particulate filter 44. The canisters 36, 42 may be separate components joined together with a clamp or other feature such that the canisters 36, 42 may be separated for servicing and other operations. Of course, the present invention is not intended to be limited to this exemplary configuration for the particulate filter assembly 30. Rather, the present invention contemplates the particulate filter assembly including more or less of these components and features. In particular, the present invention contemplates the particulate filter assembly 30 including only the particulate filter 44 and not necessarily the OC canister 36 or substrate 38 and that the particulate filter 44 may be located in other portions of the exhaust system 20, such as upstream of the turbine 32.

The OC 38, which for diesel engines is commonly referred to as a diesel oxidation catalyst, may oxidize hydrocarbons and carbon monoxide included within the exhaust gases so as to increase temperatures at the particulate filter 44. The particulate filter 44 may capture particulates included within the exhaust gases, such as carbon, oil particles, ash, and the like, and regenerate the captured particulates if temperatures associated therewith are sufficiently high. In accordance with one non-limiting aspect of the present invention, one object of the particulate filter assembly 30 is to capture harmful carbonaceous particles included in the exhaust gases and to store these contaminates until temperatures at the particulate filter 44 favor oxidation of the captured particulates into a gas that can be discharged to the atmosphere.

The OC and particulate filter canisters 36, 42 may include inlets and outlets having defined cross-sectional areas with expansive portions there between to store the OC 38 and particulate filter 44, respectively. However, the present invention contemplates that the canisters 36, 42 and devices therein may include any number configurations and arrangements for oxidizing emissions and capturing particulates. As such, the present invention is not intended to be limited to any particular configuration for the particulate filter assembly 30.

To facilitate oxidizing the capture particulates, a doser 50 may be included to introduce fuel to the exhaust gases such that the fuel reacts with the OC 38 and combusts to increase temperatures at the particulate filter 44, such as to facilitate regeneration. For example, one non-limiting aspect of the present invention contemplates controlling the amount of fuel injected from the doser as a function of temperatures at the particulate filter 44 and other system parameters, such as air mass flow, EGR temperatures, and the like, so as to control regeneration. However, the present invention also contemplates that fuel may be included within the exhaust gases through other measures, such as by controlling the engine 14 to emit fuel with the exhaust gases.

An air intake system 52 may be included for delivering fresh air from a fresh air inlet 54 through an air passage to an intake manifold for introduction to the engine 14. In addition, the system 52 may include an air cooler or charge air cooler 56 to cool the fresh air after it is compressed by the compressor 34. Optionally, a throttle intake valve 58 may be provided to control the flow of fresh air to the engine 14. Optionally, the throttle intake valve 58 may also be provided to control the flow of EGR gases to the engine 14 or control both fresh air and EGR gases 64 to the engine 14. The throttle valve 58 may be a manually or electrically operated valve, such as one which is responsive to a pedal position of a throttle pedal operated by a driver of the vehicle. There are many variations possible for such an air intake system and the present invention is not intended to be limited to any particular arrangement. Rather, the present invention contemplates any number of features and devices for providing fresh air to the intake manifold and cylinders, including more or less of the foregoing features.

An exhaust gas recirculation (EGR) system 64 may be optionally provided to recycle exhaust gas to the engine 14 for mixture with the fresh air. The EGR system 64 may selectively introduce a metered portion of the exhaust gasses into the engine 14. The EGR system 64, for example, may dilute the incoming air charge and lower peak combustion temperatures to reduce the amount of oxides of nitrogen produced during combustion. The amount of exhaust gas to be recirculated may be controlled by controlling an EGR valve 66 and/or in combination with other features, such as the turbocharger. The EGR valve 66 may be a variable flow valve that is electronically controlled. There are many possible configurations for the controllable EGR valve 66 and embodiments of the present invention are not limited to any particular structure for the EGR valve 66.

The EGR system 64 in one non-limiting aspect of the present invention may include an EGR cooler passage 70, which includes an EGR cooler 72, and an EGR cooler bypass 74. The EGR valve 66 may be provided at the exhaust manifold to meter exhaust gas through one or both of the EGR cooler passage 70 and bypass 74. Of course, the present invention contemplates that the EGR system 64 may include more or less of these features and other features for recycling exhaust gas. Accordingly, the present invention is not intended to be limited to any one EGR system and contemplates the use of other such systems, including more or less of these features, such as an EGR system having only one of the EGR cooler passage or bypass.

A cooling system 80 may be included for cycling the engine 14 by cycling coolant there through. The coolant may be sufficient for fluidly conducting away heat generated by the engine 14, such as through a radiator. The radiator may include a number of fins through which the coolant flows to be cooled by air flow through an engine housing and/or generated by a radiator fan directed thereto as one skilled in the art will appreciated. It is contemplated, however, that the present invention may include more or less of these features in the cooling system 80 and the present invention is not intended to be limited to the exemplary cooling system described above.

The cooling system 80 may operate in conjunction with a heating system 84. The heating system 84 may include a heating core, a heating fan, and a heater valve. The heating core may receive heated coolant fluid from the engine 14 through the heater valve so that the heating fan, which may be electrically controllable by occupants in a passenger area or cab of a vehicle, may blow air warmed by the heating core to the passengers. For example, the heating fan may be controllable at various speeds to control an amount of warmed air blown past the heating core whereby the warmed air may then be distributed through a venting system to the occupants. Optionally, sensors and switches 86 may be included in the passenger area to control the heating demands of the occupants. The switches and sensors may include dial or digital switches for requesting heating and sensors for determining whether the requested heating demand was met. The present invention contemplates that more or less of these features may be included in the heating system and is not intended to be limited to the exemplary heating system described above.

A controller 92, such as an electronic control module or engine control module, may be included in the system 10 to control various operations of the engine 14 and other system or subsystems associated therewith, such as the sensors in the exhaust, EGR, and intake systems. Various sensors may be in electrical communication with the controller via input/output ports 94. The controller 92 may include a microprocessor unit (ECU) 98 in communication with various computer readable storage media via a data and control bus 100. The computer readable storage media may include any of a number of known devices which function as read only memory 102, random access memory 104, and non-volatile random access memory 106. A data, diagnostics, and programming input and output device 108 may also be selectively connected to the controller via a plug to exchange various information therebetween. The device 108 may be used to change values within the computer readable storage media, such as configuration settings, calibration variables, instructions for EGR, intake, and exhaust systems control and others.

The system 10 may include an injection mechanism 114 for controlling fuel and/or air injection for the cylinders 18. The injection mechanism 114 may be controlled by the controller 92 or other controller and comprise any number of features, including features for injecting fuel and/or air into a common-rail cylinder intake and a unit that injects fuel and/or air into each cylinder individually. For example, the injection mechanism 114 may separately and independently control the fuel and/or air injected into each cylinder such that each cylinder may be separately and independently controlled to receive varying amounts of fuel and/or air or no fuel and/or air at all. Of course, the present invention contemplates that the injection mechanism 114 may include more or less of these features and is not intended to be limited to the features described above.

The system 10 may include a valve mechanism 116 for controlling valve timing of the cylinders 18, such as to control air flow into and exhaust flow out of the cylinders 18. The valve mechanism 116 may be controlled by the controller 92 or other controller and comprise any number of features, including features for selectively and independently opening and closing cylinder intake and/or exhaust valves. For example, the valve mechanism 116 may independently control the exhaust valve timing of each cylinder such that the exhaust and/or intake valves may be independently opened and closed at controllable intervals, such as with a compression brake. Of course, the present invention contemplates that the valve mechanism may include more or less of these features and is not intended to be limited to the features described above.

In operation, the controller 92 receives signals from various engine/vehicle sensors and executes control logic embedded in hardware and/or software to control the system 10. The computer readable storage media may, for example, include instructions stored thereon that are executable by the controller 92 to perform methods of controlling all features and sub-systems in the system 10. The program instructions may be executed by the controller in the ECU 98 to control the various systems and subsystems of the engine and/or vehicle through the input/output ports 94. In general, the dashed lines shown in FIG. 1 illustrate the optional sensing and control communication between the controller and the various components in the powertrain system. Furthermore, it is appreciated that any number of sensors and features may be associated with each feature in the system for monitoring and controlling the operation thereof.

In one non-limiting aspect of the present invention, the controller 92 may be the DDEC controller available from Detroit Diesel Corporation, Detroit, Mich. Various other features of this controller are described in detail in a number of U.S. patents assigned to Detroit Diesel Corporation. Further, the controller may include any of a number of programming and processing techniques or strategies to control any feature in the system 10. Moreover, the present invention contemplates that the system may include more than one controller, such as separate controllers for controlling system or subsystems, including an exhaust system controller to control exhaust gas temperatures, mass flow rates, and other features associated therewith. In addition, these controllers may include other controllers besides the DDEC controller described above.

In accordance with one non-limiting aspect of the present invention, the controller 92 or other feature, may be configured for permanently storing emission related fault codes in memory that is not accessible to unauthorized service tools. Authorized service tools may be given access by a password and in the event access is given, a log is made of the event as well as whether any changes that are attempted to made to the stored fault codes. It is contemplated that any number of faults may be stored in permanent memory, or rewritable memory, and that preferably such faults are stored in rewritable memory.

Figure 2:
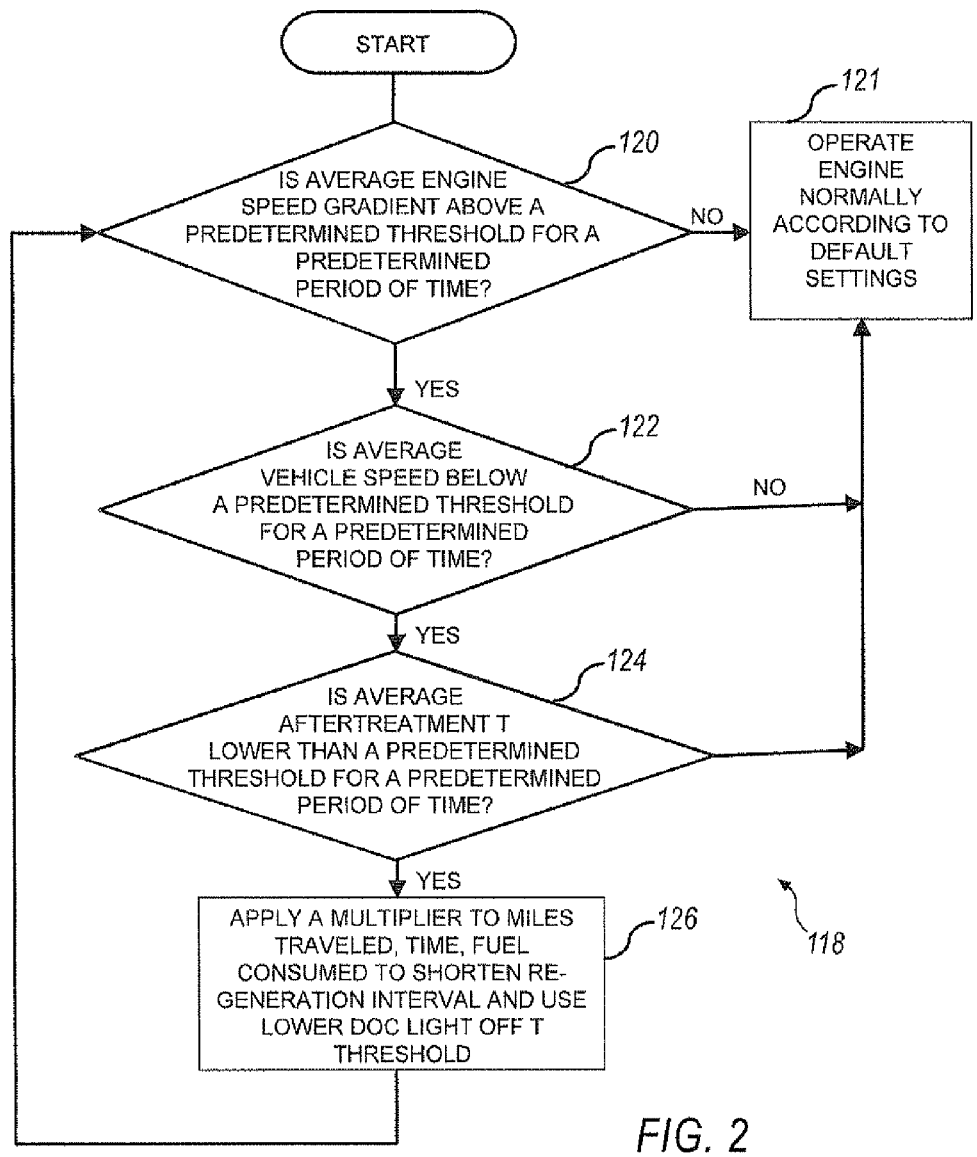
FIG. 2 is a software flowchart detailing the steps of one method according to one embodiment of the present invention.

FIG. 2 is a schematic representation of a software flowchart of one method 118 according to one embodiment of the present invention. Specifically, step 120 is determining whether the average engine speed gradient is above a predetermined threshold for a predetermined period of time. In this context, it is necessary to operate the engine for some predetermined period of time in order to ensure that the engine is operating under real driving conditions. In addition, it is necessary to use a predetermined gradient threshold so that as the vehicle travels up ad down hills or gradients, at some point to be predetermined by an operator, the controller understands that the vehicle is operating in a gradient that is beyond the predetermined gradient for purposes of this determination.

If the determination to step 118 is no, the software proceeds to step 121, which is, continue to operate the engine in normal operating mode. If the determination in step 118 is yes, then step 122 is determining whether the average vehicle speed is below a predetermined threshold for a predetermined period of time. If the determination is no, the software proceeds to step 121. If the determination is yes, the software proceeds to step 124, which is deterring whether the average aftertreatment temperature is below a predetermined threshold. If the answer is no, the software proceeds to step 120. If the determination is yes, the software proceeds to step 126, which is applying a multiplier to the miles traveled, time duration and fuel consumed to shorten the regeneration interval and use a lower DOC light off temperature threshold to initiate DPF regeneration. Typically, DPF regeneration occurs at about 285° C., however, in this mode of operation, the DPF will regenerate at a range of about 275° C. This lower temperature will permit regeneration and the multiplier factor, generally taken as about 1.25, has the effect of increasing the actual time, miles traveled and regeneration T to cause the controller to initiate the regeneration procedures in a normal manner. In addition, since the multiplier factor increases the miles traveled, the time and the temperature, the interval between regenerations is shortened, thereby contributing to increased efficiency of the DPF when an urban driving cycle is detected.

The determinations given above are not to be construed as having to be all present or answered in the affirmative. Rather, it is contemplated that all the determinations given above may have to be in the affirmative, or that only one or any number of them determined to be in the affirmative in order for the methods contemplated to be initiated.

Those skilled in the art recognize that the words used in this specification are words of description, and not words of limitation. Many variations and modifications will become apparent upon a reading of the specification without departing fro the scope and spirit of the appended claims.

What is claimed as new and desired to be protected by Letters Patent of the United States is:

1. A method for operating an internal combustion engine in a vehicle, said engine equipped with an exhaust after treatment system including sensors, a Diesel Oxidation Catalyst (DOC), a Diesel Particulate Filter (DPF), and an Engine Control System (ECS) with memory to detect drive cycle and adjust engine aftertreatment operation accordingly, comprising:
    determining whether an average operating parameter is outside a predetermined threshold for a predetermined period of time; and
    applying a multiplier to miles driven, time duration, and fuel consumed during vehicle operation to modify a DOC regeneration interval and utilize a lower DOC light off temperature threshold to regenerate said DPF and shorten intervals between DPF regeneration.

2. The method of claim 1, wherein said average operating parameter is average engine speed gradient above a predetermined threshold for a predetermined period of time.

3. The method of claim 1, wherein said average operating parameter is average vehicle speed below a predetermined threshold for a predetermined period of time.

4. The method of claim 1, wherein said average operating parameter is average temperature of an aftertreatment device lower than a predetermined threshold for a predetermined period of time.

5. The method of claim 1, wherein said multiplier is a factor designed to cause the controller to perform as if a perceived period of time is greater than actual, the miles driven is perceived to be greater than actually driven, and the fuel consumed is greater than actually consumed to shorten the interval between aftertreatement regeneration cycles.

6. The method of claim 1, wherein said multiplier value is approximately 1.25.

7. The method of claim 1, wherein said lower DOC light off temperature is a range of about 275° C.

8. A method for operating an internal combustion engine in a vehicle, said engine equipped with an Engine Control System (ECS) with memory, and an exhaust after treatment system including sensors, a Diesel Oxidation Catalyst (DOC), and a Diesel Particulate Filter (DPF), to detect drive cycle and adjust engine aftertreatment operation accordingly, comprising:
    determining whether an average engine speed gradient is above a predetermined threshold for a predetermined period of time;
    determining whether an average vehicle speed is below a predetermined threshold for a predetermined period of time;
    determining whether an average temperature of an aftertreatment component is lower that a predetermined threshold for a predetermined period of time; and
    applying a multiplier to miles driven, time duration, and fuel consumed during vehicle operation to modify a DOC regeneration interval and utilize a lower DOC light off temperature threshold to regenerate said DPF and shorten intervals between DPF regeneration.

9. The method of claim 8, wherein said multiplier is a factor designed to cause the controller to perform as if a perceived period of time is greater than actual, the miles driven is perceived to be greater than actually driven, and the fuel consumed is greater than actually consumed to shorten the interval between aftertreatment regeneration cycles.

10. The method of claim 8, wherein said multiplier value is approximately 1.25.

11. The method of claim 8, wherein said lower DOC light off temperature is in a range of about 275° C.

* * * * *